(12) United States Patent
Hall

(10) Patent No.: US 7,140,816 B2
(45) Date of Patent: Nov. 28, 2006

(54) MULTI-FUNCTIONAL TUBE MILLING HEAD

(75) Inventor: J. Randall Hall, Wadsworth, OH (US)

(73) Assignee: H&S Tool, Inc., Wadsworth, OH (US)

( * ) Notice: Subject to any disclaimer, the term of this patent is extended or adjusted under 35 U.S.C. 154(b) by 25 days.

(21) Appl. No.: 10/894,831

(22) Filed: Jul. 20, 2004

(65) Prior Publication Data

US 2006/0018726 A1    Jan. 26, 2006

(51) Int. Cl.
*B23C 3/12* (2006.01)

(52) U.S. Cl. ............... 409/138; 409/140; 408/203.5; 408/224

(58) Field of Classification Search .......... 409/140, 409/138; 82/113; 407/31, 37, 46, 61; 408/203.5, 408/223–224
See application file for complete search history.

(56) References Cited

U.S. PATENT DOCUMENTS

| | | | | |
|---|---|---|---|---|
| 1,204,994 | A | * | 11/1916 | Kendall ............... 408/146 |
| 3,051,059 | A | * | 8/1962 | Davey ............... 408/82 |
| 3,157,078 | A | | 11/1964 | Arthur |
| 3,228,268 | A | * | 1/1966 | Strout ............... 408/104 |
| 3,976,388 | A | * | 8/1976 | Webb ............... 408/211 |
| 4,091,699 | A | | 5/1978 | Chaze et al. |
| 4,192,067 | A | | 3/1980 | Calhoun et al. |
| 4,364,290 | A | * | 12/1982 | Astle ............... 82/158 |
| 4,437,366 | A | | 3/1984 | Astle |
| 4,449,871 | A | | 5/1984 | Hillestad |
| 4,459,883 | A | * | 7/1984 | Astle ............... 82/113 |
| 4,486,131 | A | * | 12/1984 | Eckle ............... 408/185 |
| 4,498,820 | A | | 2/1985 | Brennan |
| 4,601,222 | A | | 7/1986 | Gill |
| 4,633,555 | A | | 1/1987 | Legge |
| 4,689,920 | A | | 9/1987 | Geise |
| 4,691,600 | A | | 9/1987 | Carlson et al. |
| 4,718,201 | A | | 1/1988 | Legge |
| 4,739,688 | A | | 4/1988 | Brennan et al. |
| 4,743,149 | A | | 5/1988 | Geise |

(Continued)

FOREIGN PATENT DOCUMENTS

GB    2092934 A  *  8/1982

OTHER PUBLICATIONS

Babcock/Deutsche Babcock Catalog Pages, publication date purportedly Jan. 1992, 5 pages purportedly from Catalog.

*Primary Examiner*—Monica Carter
*Assistant Examiner*—Eric A. Gates
(74) *Attorney, Agent, or Firm*—Hudak, Shunk & Farine Co. LPA

(57) ABSTRACT

A milling head for a rotary tool, which is preferably utilized to process, prepare, or otherwise impart a desired finish to a workpiece, preferably an end portion of a tube. In a preferred embodiment, the milling head includes at least three different cutting or milling surfaces each capable of performing a distinct operation on a workpiece. In one embodiment, the milling head includes a) a membrane milling and/or outer diameter tube film removal element; b) a beveling element capable of imparting a bevel to the tube end; and c) an inner diameter tube film removal element. The milling head milling surfaces are adjustable in order to accommodate tubes of different wall thicknesses and diameters. The milling head is preferably attached to a rotary milling tool, i.e., a drill. Methods of performing operations on workpieces with the milling head are disclosed.

33 Claims, 3 Drawing Sheets

U.S. PATENT DOCUMENTS

| | | |
|---|---|---|
| 4,830,551 A | 5/1989 | Brennan et al. |
| 4,872,249 A | 10/1989 | VanderPol et al. |
| 4,889,454 A | 12/1989 | Hillestad et al. |
| 4,979,294 A | 12/1990 | Bowman et al. |
| 5,033,347 A | 7/1991 | Hillestad et al. |
| 5,044,075 A | 9/1991 | Brennan et al. |
| 5,211,212 A | 5/1993 | Carlson et al. |
| 5,304,018 A | 4/1994 | LaVanchy et al. |
| 5,314,270 A | 5/1994 | Lavancy et al. |
| 5,356,248 A | 10/1994 | Hillestad |
| 5,531,550 A | 7/1996 | Moruzzi |
| 5,542,177 A | 8/1996 | Hillestad |
| 5,911,548 A * | 6/1999 | Deiss et al. .......... 409/234 |
| 2004/0234349 A1 | 11/2004 | Ueda et al. |
| 2005/0053432 A1 | 3/2005 | Hall |
| 2005/0063440 A1 | 3/2005 | Hall |

* cited by examiner

MULTI-FUNCTIONAL TUBE MILLING HEAD

FIELD OF THE INVENTION

The present invention relates to a milling head for a rotary tool, which is preferably utilized to process, prepare, or otherwise impart a desired finish to a workpiece, preferably an end portion of a tube. In a preferred embodiment, the milling head includes at least three different cutting or milling surfaces each capable of performing a distinct operation on a workpiece. In one embodiment, the milling head includes a) a membrane milling and/or outer diameter tube film removal element; b) a beveling element capable of imparting a bevel to the tube end; and c) an inner diameter tube film removal element. The milling head milling surfaces are adjustable in order to accommodate tubes of different wall thicknesses and diameters. The milling head is preferably attached to a rotary milling tool, i.e., a drill. Methods for performing operations on workpieces with the milling head are disclosed.

BACKGROUND OF THE INVENTION

Power generating or other plants circulate fluids, such as water or steam, through tubes or banks of tubes. The fluid is often heated and used, for example, to drive turbines which generate electricity.

The tubes are generally arranged in large panels or banks of parallel tubes which are often connected together with a metal membrane or web continuously interposed between each pair of adjacent tubes in the bank to form a tube wall. The web or membrane connecting adjacent tubes to each other generally has a thickness about equal to the wall thickness of the tubes, with the width of the webbing generally ranging from about 0.25 inch to about 0.75 inch. The webs or membranes are generally welded to the outer walls of adjacent tubes to form the tube banks. In some cases a weld overlay comprising a metal or alloy is present on portions of the tube bank in an effort to prevent corrosion or deterioration. The weld overlay is present on both sides of a tube bank in some embodiments. On account of deterioration due to corrosion and the like, the tubes occasionally require replacement. Ordinarily, repair of damaged or worn tubing involves cutting and removal of relatively large sections of the tube banks, and replacement with a new panel of tubes. The bank sections are generally replaced in large rectangular sections typically having sizes ranging from a few feet to 10, 20, 100 or even 200 feet in length.

The sections of tube banks which are to be replaced are generally cut out using a power saw or a cutting torch. A method and apparatus for cutting out a section of boiler tube wall is illustrated and described in U.S. Pat. No. 5,033,347, herein fully incorporated by reference.

After the damaged or worn section of tube wall which is to be replaced has been cut out and removed, it is necessary to properly prepare the tube ends exposed by removal of the old section before positioning the new tube bank section in the tube wall opening. Proper preparation of the exposed tube ends of the existing boiler tube wall requires chamfering or beveling of the exposed tube ends to facilitate a good weld between the new tube wall section and the existing boiler tube wall. More specifically, the adjoining tube ends of the existing tube wall and those of the new or replacement section of tube wall should be provided with a frustoconical bevel so that when the adjoining tube ends are placed in alignment, a circumferential groove is formed to receive molten metal from the welding rod. The replacement section of tube wall is usually fabricated and prepared for welding off-site before the damaged or worn section of existing tube wall is removed. The exposed tube ends of the existing tube wall, however, must be prepared for welding on-site, often in a confined space. It is highly desirable that all work performed on the existing tube wall be conducted as quickly and efficiently as possible so as to minimize the period during which the steam generator is taken out of service for repair. Accordingly, preparation of the exposed tube ends of the existing tube wall for welding is generally accomplished using portable hand-held milling tools such as those disclosed in U.S. Pat. Nos. 4,449,871 and 4,889,454, herein fully incorporated by reference.

To facilitate rapid and efficient chamfering or beveling of the exposed tube ends of the existing tube wall using conventional milling tools, and to provide ample space between vertically adjacent tubes for welding around the entire circumference of the tube ends, it is highly desirable and generally necessary to remove a portion of the membrane between each pair of exposed tube ends of the existing tube wall. Typically, it is desirable to remove the membrane between adjacent tube ends, which are exposed by removal of the damaged wall section, from the horizontally cut edge of the existing boiler tube wall to a depth which is at least equal to the depth of the frustoconical bevel which is to be milled at the tube end. Typically, membrane material is removed from the horizontally cut edge between two adjacent tubes to a depth of about ⅜ inch, about ¾ inch, or about 1 inch or more from the cut edge.

The prior art membrane removal heads seize, stutter and/or stop cutting when exposed to weld overlay or tube material. After the membrane material and/or welding overlay material removal, a frustoconical bevel is milled on the tube around the entire circumference thereof. Afterwards, a second tube with a corresponding bevel is matched with the first beveled tube and the tubes are welded together by molten metal or solder placed around the joined tubes, especially at the circumferential groove formed by the adjoined beveled tube ends. It has been found that beveled tubes joined in this prior manner without diameter cleanup or film removal often have weaknesses at the weld area, occasionally due to pitting, which causes air pockets or lack of weld strength. It would be beneficial to form a strong durable weld between joined tubes having beveled or chamfered ends.

SUMMARY OF THE INVENTION

The present invention provides an apparatus and methods for preparing a workpiece such as a tube, pipe, or the like for a subsequent operation such as welding. The tube can be an individual tube such as an economizer tube, a superheat tube, or reheat tube, element tube, or the like, or even be part of a bank of tubes which are often connected by a membrane. In one embodiment, the apparatus is a milling head or bit having at least an inner diameter film removal element, and preferably three different types of milling elements.

In a preferred embodiment, the milling head comprises a plurality of milling element types which each are capable of performing a different operation on a tube, simultaneously or substantially simultaneously. A first type of milling element is utilized to mill an inner surface of the tube, and around the inner circumference extending from the end portion of the tube to a predetermined depth. A second type of milling element is utilized to mill an outer surface of the tube, or a portion of a membrane or weld overlay, if present, on the tube in the area where the milling operation is to be performed, or a combination thereof. A third type of milling element is adapted to mill a frustoconical bevel on the end portion of a tube. Thereafter a second tube end, preferably milled or finished in a similar manner, can be aligned with the first end and the tubes welded together around their circumferences.

The first type of milling element is utilized to remove a predetermined radial thickness tube film or material from an inner surface or portion of the tube, preferably around the inner circumference thereof to a predetermined depth or distance from the tube end. The inner surface milling element comprises at least one cutting blade. The cutting surface of the blade generally faces away from the central axis so the inner surface of the tube can be milled by the inner surface milling element. In a preferred embodiment, the milling element is adjustable in a radial direction with respect to the central axis of the milling head. Thus, the milling element can be adjusted so that a predetermined thickness or amount of inner tube material is removed. The inner tube film removal milling element blade or cutting surface can be arranged or affixed at a predetermined angle with respect to an axis parallel to the central axis of the milling head. Thus a greater amount of material can be removed from one inner section of a tube than another, creating an angled inner wall for example, such as to accommodate space for a chill ring or create a gradual change in the inner diameter of the tube end portion area preferably in order to match the inner diameter of a second tube. Also, the adjustability of the first type of milling element allows tubes of different inner diameters to be treated with a single milling head.

The second type of milling element generally performs a tube cleanup step by removing a small or micro-diameter portion or film thickness substantially around the entire outer circumference of a tube end with the rotary milling device or power tool. The tube film is removed preferably at least in an area to be beveled, or also in an area adjacent to an area to be beveled. Advantageously, the outer tube film removal milling element is also capable of removing any weld overlay or membrane present on the surface of a tube. A predetermined radial thickness or annulus from the circumference of the outer diameter of the tube is removed with the second milling element which comprises one or more blades or cutting edges arranged on the milling tool. Preferably, the radial film removal provides a substantially bare metal surface which is free of rust, scale, etc.

The third type of milling element generally comprises one or more bevel cutting blades which are preferably fixed at a desired angle in order to mill the exposed tube end and form a bevel thereon having a predetermined angle with respect to an axis perpendicular to the longitudinal axis of the tube. In a preferred embodiment, the bevel milling element is adjustable in a radial direction with respect to the central axis of the milling head.

It is an object of the invention to provide a method for removing material from an inner diameter of a tube or other workpiece; as well as placing a bevel on a tube end, or removing tube material from an outer surface of the tube, or a combination thereof. In a preferred embodiment, all three operations are performed with the milling head of the present invention. A milling head having different types of milling elements with cutting surfaces or blades configured to perform the method is described in detail. The multi-functional milling head of the present invention allows for precision milling of tube ends where the tube surface is prepared for a subsequent welding or other operation. The milling head being capable of performing multiple simultaneous or substantially simultaneous operations enables a user to efficiently complete tube preparation.

The multi-functional milling head includes a mounting portion at one of its axial ends and is adapted to be attached to a rotary power tool, preferably an arbor or shaft thereof. The milling tool typically includes an arbor adapted to be inserted into an exposed tube end and is utilized to position and stabilize the milling head to prevent movement or jerking of the tool in a direction lateral to the longitudinal direction of the tube during the milling operation. In order to perform a milling operation, the drive means for the rotary power tool is actuated, and the tool and attached milling head are urged toward the tube end whereby the milling surfaces of the milling head contact the tube end in predetermined places in order to provide a desired finish to the tube end. In addition to performing an operation which removes tube material from the inner surface or circumference of the tube in the vicinity of the tube end, the method can also include removal of material from the outer circumference of the tube, removal of membrane between adjacent tubes, or beveling of the end portion of the tube, or combinations thereof.

It is yet another object of the present invention to provide a milling head having adjustable milling elements in order that different size, i.e. diameter, tubes or workpieces can be accommodated. In one embodiment, the inner surface milling element is fixable in a range of distances from a central axis of the milling head. In a further embodiment, the bevel milling element is fixable in a range of distances from the central axis of the milling head.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
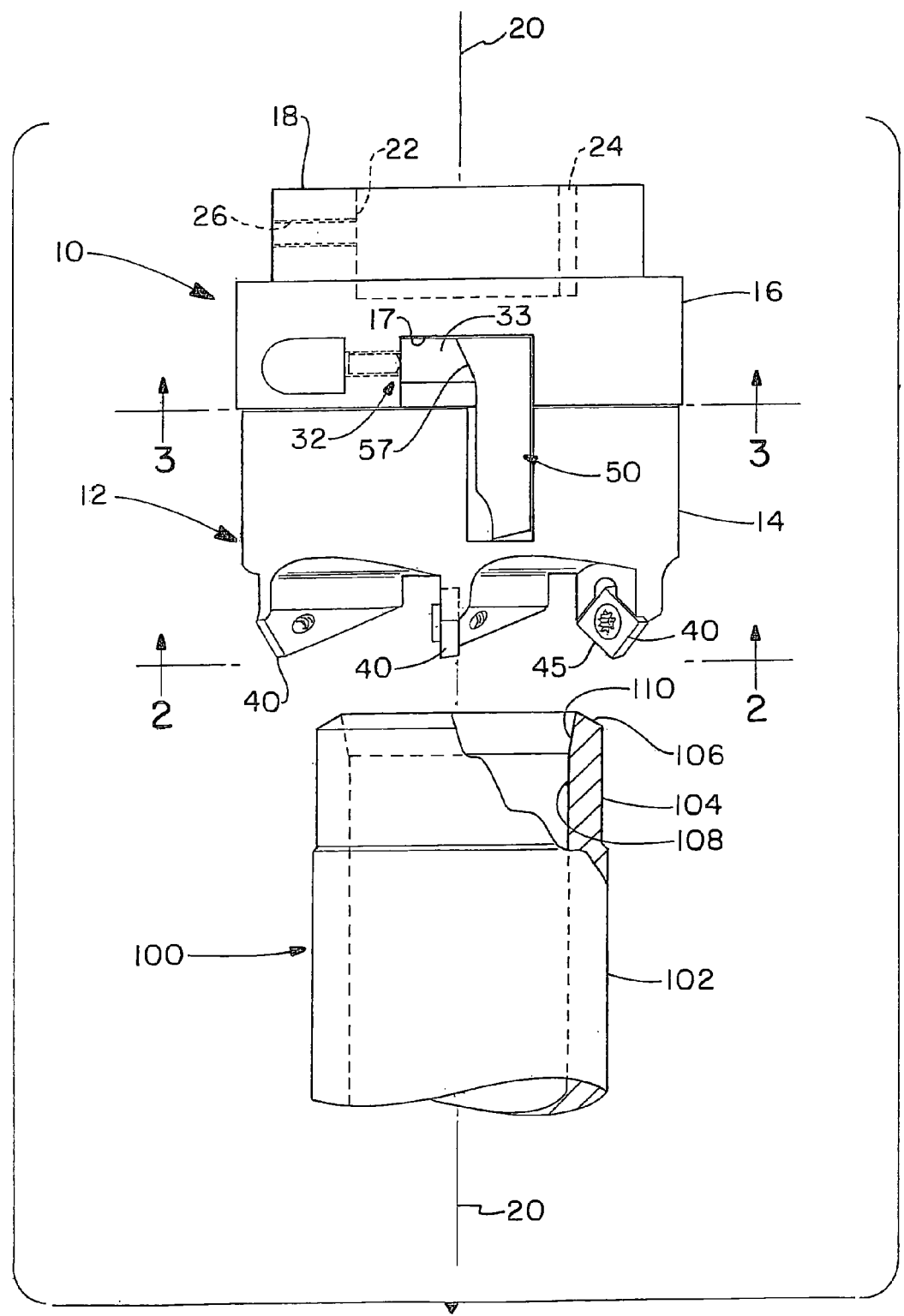
FIG. 1 is an elevational view of a milling head according to the present invention, the figure also showing a tubular member or workpiece which is shaped by the milling head of the invention.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 5:
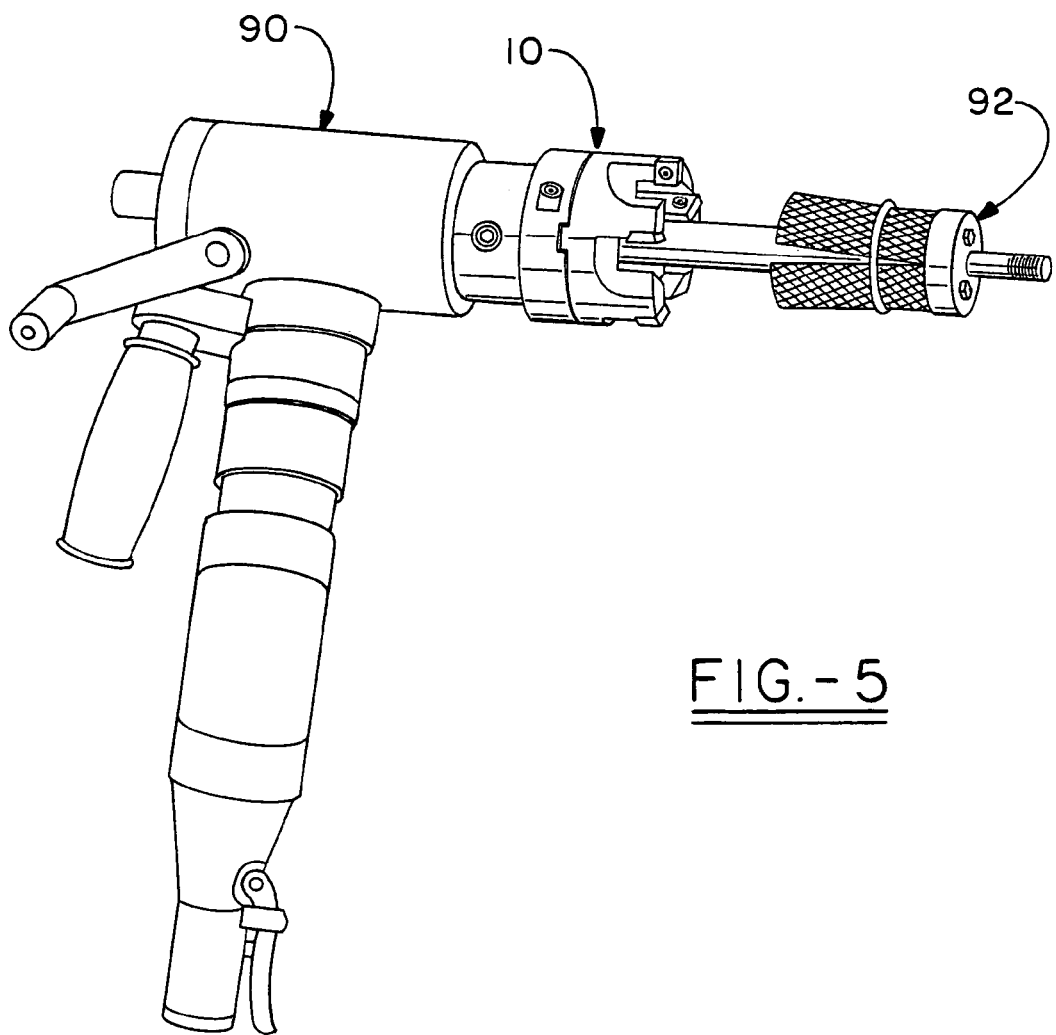
FIG. 5 is a perspective view of a pneumatic rotary milling tool which may be used with the milling head of the present invention for the purpose of reshaping a tubular member or workpiece such as illustrated in FIG. 1.

FIG. 1 illustrates an elevational view of a milling head 10 of the present invention positioned above a workpiece 100 which in this instance is a tube. Preferred workpieces are hollow cylinders. Workpiece 100 is generally made of steel, but it is to be understood that other metals, or polymers, or combinations thereof can be utilized to form the workpiece. The milling head 10 of the present invention can be attached to a power tool 90 as illustrated in FIG. 5 and utilized to perform a milling operation on workpiece 100. The milling head 10 of the present invention is at least utilized to remove tube material from an inner portion or diameter of workpiece 100, preferably in an area extending from an end portion of the tube. Tube 100 shown in FIG. 1 has been milled utilizing a milling head 10 of the present invention. Workpiece 100 as shown is substantially cylindrical along central axis 20. As illustrated, the upper milled end of workpiece 100 has an outer milled segment 104 on outer surface 102, as well as beveled segment 106, and inner milled segment 110 located on inner surface 108. An angled shoulder is created at each location at the end of the inner and outer milling element 30,40 milling paths. The shoulder angles can be varied, can be gradual or pronounced, and generally depend on the needs or desires of the end user. The outer shoulder can have an angle which generally ranges from about 0° to about 85°, desirably from 5° to about 60°, with angles of about 10° to about 45° preferred, measured with respect to an axis perpendicular to central axis 20. The outer shoulder angle can be produced by fixing a cutting edge 45 of the outer tube milling element 40 at one of the above-noted angles. A 45° cutting edge angle is shown in FIG. 1.

The milling head 10 is preferably attached to a milling device such as rotary milling tool 90 shown in FIG. 5. Rotary milling devices are well known in the art and are commercially available from sources such as H&S Tool of Wadsworth, Ohio. Examples include, but are not limited to, Model MB, Model MS, Model B, Model MT and Model MFT. Rotary milling devices are generally electrically or pneumatically powered.

Milling head 10 as illustrated in FIGS. 1 through 4 includes a substantially cylindrical body 12 having an upper portion 14 and a lower portion 16. It is to be understood that in other alternative embodiments body 12 can have other shapes and/or be formed having unitary construction, i.e. integrally formed upper and lower portions. Being generally cylindrical, milling head 10 includes a central axis 20 extending in a direction along a longitudinal axis thereof. The lower portion 16 includes a tool mounting connection 18 for removable connection to a milling tool. In a preferred embodiment, the tool mounting connection 18 has a bore 22, preferably cylindrical for attachment to an arbor or other portion of rotary milling tool 90. In one embodiment, the cylindrical bore 22 includes a key slot 24 which matingly engages a key on the tool gearing to lock the rotary milling head 10 to the tool. In a further embodiment as illustrated in FIG. 1, mounting portion 18 is provided with a radially threaded bore 26 which receives a hexagonal head socket screw or other fastener in bore 26 which can be used to removably secure the milling head to rotary milling tool 90. Of course, various other means for mounting milling head 10 to an output shaft of a rotary milling tool are known, such as a threaded bore on a milling head mounting portion for screwing a milling head to a threaded output shaft of a rotary tool, or any of various conventional tool chucks or other means for mounting a tool piece to the rotary or output shaft of a rotary milling tool.

Figure 2:
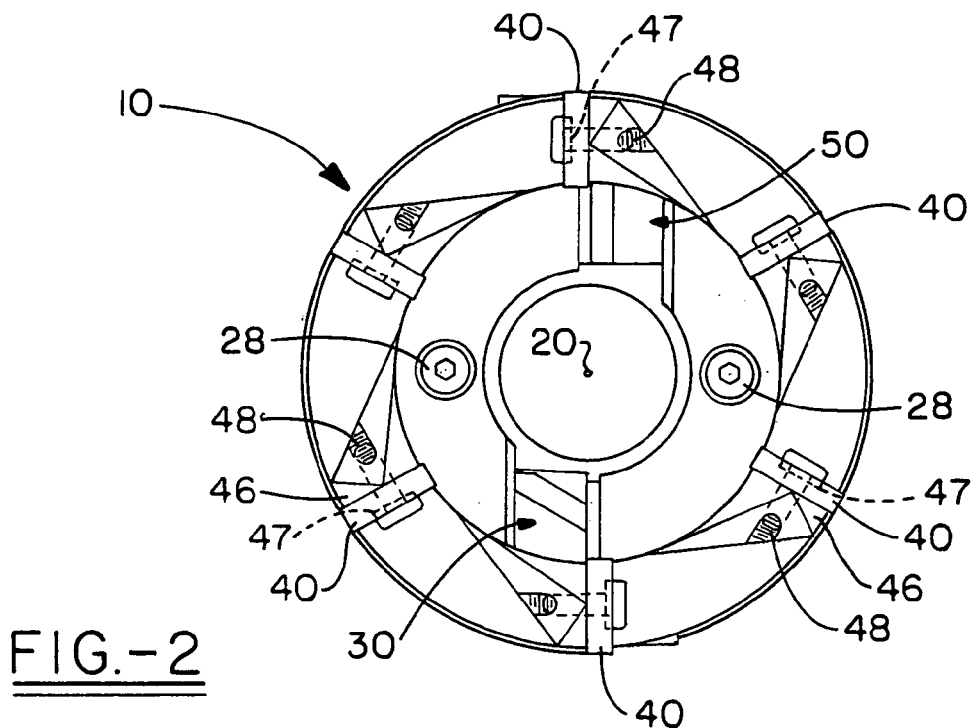
FIG. 2 is a plan view of the milling head as may be taken in a direction of line 2—2 in FIG. 1.

As best shown in FIG. 2, milling head 10 of the present invention preferably includes an inner tube milling element 30 utilized to remove a predetermined amount of material from an inner portion of the tube preferably around the circumference thereof to a predetermined depth; an outer tube milling element 40 designed to remove a predetermined amount of material from an outer portion of the tube preferably around the circumference thereof to a predetermined depth; and a bevel milling element 50 utilized to impart a beveled surface on an end of the tube. In relation to central axis 20, the cutting surface 34 of inner milling element 30 is located radially closer thereto when compared to the cutting surface or blade 44 of outer milling element 40 as illustrated in FIG. 2. Bevel milling element 50 also includes a cutting surface 54 having portions which are located radially closer to central axis 20 when compared to outer milling element 40. Bevel milling element 50 preferably has cutting surfaces located at radial distances which overlap with inner milling element 30 or outer element 50 cutting surfaces, or combinations thereof. The overlap between the milling elements is due to the strategic location or arrangement of milling elements 30, 40, and 50 on milling head 10 of the present invention as illustrated in the attached figures. The overlap between the various milling elements can be precisely controlled due to the adjustability of at least inner milling element 30, or bevel milling element 50, or a combination thereof in relation to the remaining portions of the milling head 10.

Figure 3:
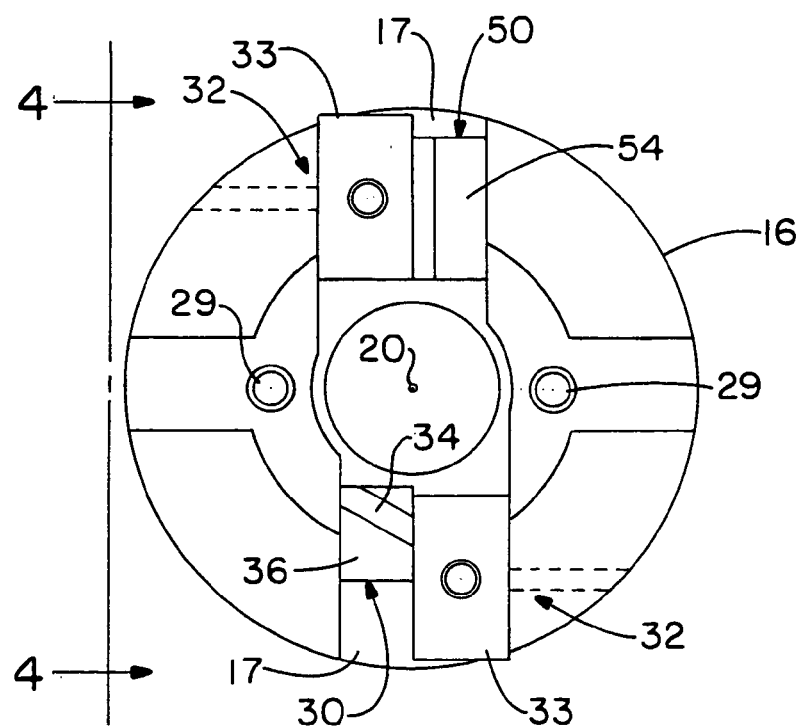
FIG. 3 is a plan view of a portion of the milling head as may be taken in the direction of line 3—3 in FIG. 1.

In a preferred embodiment, the outer milling element 40 is located in an upper portion 14 of milling head 10 which is fixably connected to lower milling head portion 16 such as by utilizing fasteners 28 as shown in FIG. 2 connected to bore 29 as shown in FIG. 3. FIG. 3 illustrates a lower portion 16 of milling head 10 which includes inner milling element 30 and bevel milling element 50.

Inner milling element 30 is adjustably and removably secured to lower portion of milling head 16 utilizing a fastener system 32, such as illustrated in FIG. 3. Inner milling element 30 includes cutting surface 34, generally a blade or other honed edge which is adapted to remove material such as by cutting, abrading, grinding, or the like from an inner surface of a workpiece. Cutting surface 34 generally faces away from central axis 20 in order to remove material for the tube inner surface as depicted in FIG. 1. The cutting surface 34 of inner milling element 30 is connected to base 36. Inner milling element 30 can be fixably secured at a plurality of radial distances from central axis 20 in cutting element bed 17 of milling head 10.

Figure 4:
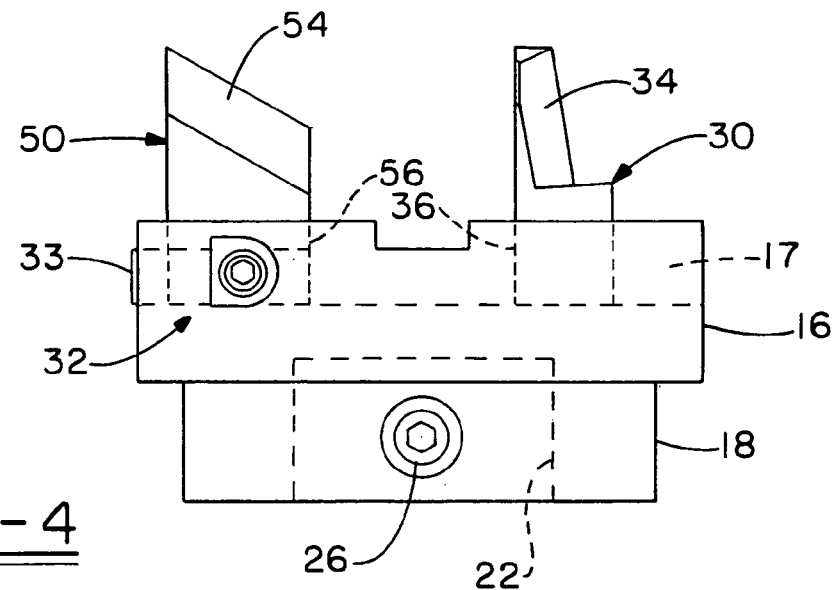
FIG. 4 is an elevational view of the lower portion of one embodiment of the milling head particularly illustrating a bevel milling element and an inner tube material removal element.

Cutting element bed 17 as illustrated in FIGS. 3 and 4 is generally a channel, groove, seat, slot or the like, having a predetermined depth such as about 0.25 inch to about 1 inch with about 0.50 inch being preferred formed in body 12 of milling head 10. In a preferred embodiment, cutting element bed 17 extends a predetermined lateral distance in a radial direction in relation to central axis 20. The width of the channel measured in a direction transverse to the radial axis is at least sufficient to accommodate or fit a portion, i.e. base 36, of the desired milling element such as the inner tube milling element 30 or bevel milling element 50, in order to secure the milling element to the body 12 of milling head 10. At least one cutting element bed 17 is present on milling head 10. In a preferred embodiment, a plurality of cutting element beds 17 are present, with one bed 17 for each milling element on lower portion 16 highly preferred. Two beds 17 are illustrated in FIGS. 2 and 3, one for the inner tube milling element 30 and one for a bevel milling element 50.

Fastener system 32 includes at least one fastener in order to removably secure a milling element to a portion of the milling head 10. In a preferred embodiment fastening system 32 comprises a threaded bore and a fastener such as a screw or bolt, although it is understood that other securing systems or fasteners can be utilized. As illustrated in FIG. 3, the fastening system includes a wedge 33 which is utilized to fixably attach a milling element to body 12 of milling head 10. Wedge 33 extends a predetermined distance along a length and width of bed 17. In a preferred embodiment of fastening system 32, a fastener is manipulated in the bore as shown in FIG. 3 and the wedge is pushed against base 36 of inner milling element 30 whereby the inner milling element is secured on milling head body 12 between wedge 33 and a wall of bed 17. In some embodiments, milling element base 36, 56, can have a tapered portion 57 which preferably form fits with a tapered portion of wedge 33 to securely hold the milling element during use.

As illustrated in FIG. 4, the cutting surface 34 of inner milling element 30 is set at an angle with respect to an axis parallel to central axis 20 of milling head 10 in order to remove a desired amount of inner tube material. In most cases the angle will depend on the end use of the tube. For example in some cases a first tube to be milled has an inner diameter different than a second tube that will be welded to the end thereof. Accordingly, the inner surface of the first tube will be milled sufficiently to match up the inner diameters of the tube at the ends thereof to prevent turbulence in the welded tubes and promote smooth flow. In still another scenario, the inner portion of the tube is milled sufficiently to accommodate a chill ring, which prevents weld material from running down the inside of a tube and creating flow problems. That said, the cutting surface 34 from a base to the end has an angle of generally from about 0° to about 60°, desirably from about 5° to about 45°, and preferably from about 10° to about 37° measured with respect to an axis parallel to the central axis 20 of the milling head. An angle of 10° is shown in FIG. 4 for cutting surface 34 of inner tube milling element 30. The inner tube milling element 30 cutting surface 34 can have any longitudinal length sufficient in order to mill a tube end to a desired depth, with about 0.25 to about 2 inches desired, and about 1 inch preferred.

In a similar manner, bevel milling element 50 can be secured to milling head body 12 in cutting element bed 17 utilizing the fastener system 32 described. Base 56 of element 50 can be secured as described hereinabove with respect to element 30. Bevel milling element 50 includes cutting surface 54 which is utilized to impart a frustoconical bevel on the end of a workpiece as exhibited by beveled segment 106 in FIG. 1. Cutting surface or edge 54 of beveled milling element 50 is disposed at a predetermined angle in order to provide the desired frustoconical bevel. The angle of cutting edge 54 with respect to the central rotational axis 20 of milling head 10 is generally from about 30° to about 60° and preferably from about 30° to about 45°. One or more bevel milling elements 50 can be present on each milling head 10. The one or more bevel milling elements 50 are located at a predetermined radial distance from axis 20 such that the bevel cutting surface at least has an annular cutting sweep capable of beveling a tube from the inner diameter to the outer diameter thereof, either before or after an inner and/or outer tube film removal operation has been performed. In a preferred embodiment as illustrated in FIGS. 1 through 4, one inner milling element 30 and one bevel milling element 50 are utilized on milling head 10. Preferably, the milling elements are located in substantially opposite radial sections of the milling head 10 as shown.

Outer workpiece milling element 40 as illustrated in FIGS. 1, 2 and 5 is utilized to remove material or film from the outer-diameter or surface of a tube by cutting, grinding or otherwise removing a film or thin annulus from the outer surface, preferably substantially completely or completely around the circumference thereof. That is, a portion of the tube outer diameter is removed, in addition to any weld overlay material and/or membrane material remaining on or surrounding the tube in the area where the outer diameter cleanup step is performed.

Milling head 10 has a configuration or design which allows the outer milling elements 40 to mill a portion of a tube, as well as any weld overlay and/or membrane that is present on one or more sides of the tube. The outer milling element 40 has a cutting face which is self-cleaning and provides for continuous cutting of surfaces, especially continuous or semi-continuous surfaces such as, but not limited to, tube circumference, weld overlay and membrane. The self-cleaning ability of the milling head substantially prevents the head from seizing, catching, and/or stopping during operation and sheds chips or shavings away from the blade cutting surfaces preferably allowing continuous, uninterrupted cutting and rotation.

Outer tube material removal with milling element 40 of milling head 10, and optionally weld overlay removal and/or membrane removal is performed to a predetermined depth measured from a workpiece end generally from about 0.25 to about 0.75 inch, desirably to about 1 inch, and preferably to about 1.5 inches or more. The outer tube milling element 40 removes an outer radial portion of the workpiece in a range generally in an amount from about 2% up to about 20%, or about 25%, desirably up to about 15%, and preferably up to about 5% or about 10% of the total tube radial thickness (annulus), measured from the inner radius to the outer radius of the tube in a radial direction from the center point or longitudinal axis 20 of the tube. The outer tube film removal step exposes a clean, bare-metal surface on the outer portion of the tube in the cleanup area. Rust, scale, or the like is removed during cleaning. The outer milled tube surface provides a strong bonding area for a subsequent welding operation.

As illustrated in FIG. 2, the milling head 10 includes one or more, and preferably a plurality of milling element supports 46 which are formed as part of the upper portion 14 of milling head 10 preferably at an end thereof. Milling element support 46 includes a cylindrical bore preferably threaded to accept a securing element or fastener 48 such as a screw. In one embodiment as illustrated in FIG. 2, milling element 40 includes a face surface having a countersink or recess 47 surrounding a bore through which the fastener connects milling element 40 to a portion of the milling head, i.e. milling element support 46.

In a preferred embodiment which advantageously provides the ability to cut away and remove workpiece films, weld overlay, or membrane, or a combination thereof, fastener has a head, end portion, or the like which extends a distance away or out from the face surface of the milling element which is less than or about equal to a second distance measured from an outer edge of fastener 48 to the nearest cutting edge 45. The first distance when compared to the second distance is generally less than about 100 percent, desirably less than about 95 percent, and preferably less than about 90 percent. In a further preferred embodiment, blade recess 47 dimensioned so that fastener 48 in a seated position provides the blade with a flat face. That is, the top of the head of fastener 48 is flush mounted or recess mounted on blade face. A preferred cutting blade is described in U.S. application Ser. No. 10/721,539, herein fully incorporated by reference.

The cutting sweep of cutting edge 45 of outer milling element 40 is such that a predetermined amount of the outer radial portion of the workpiece is removed, within the above stated ranges. The cutting edges of the blades can have either positive, neutral, or negative rakes. The shape of the milling element 40 is not limited to the embodiment shown in FIGS. 1 and 2 and alternatively could be triangular, curved, or otherwise.

The milling elements 30, 40, 50 of the invention can be arranged on milling head 10 so that the cutting surfaces or blades are located a predetermined distance from each other when measured with respect to the central axis 20. In a preferred embodiment, the outer tube milling element 40 extends from the bottom of milling head 10 nearest tool mounting connection 18 a greater distance than inner tube milling element 30. Likewise, distances between bevel milling element 50 and inner and outer tube milling elements 30 and 50 respectively can be varied and often depend on end use application.

A preferred method for utilizing milling head 10 is as follows. Milling head 10 is attached through tool mounting connection 18 to rotary milling tool 90. The rotary milling tool 90 is preferably temporarily connected or secured to the inner surface of the workpiece utilizing a collet 92 as illustrated in FIG. 5. The milling head 10 is advanced toward the tube and the outer milling element blades 44 contact and mill the outer circumference of the workpiece to a predetermined degree. Milling head 10 is further advanced along and down the tube as the milling operation is performed. Any membrane and/or weld overlay present on the surface of the workpiece is also removed within the cutting sweep of blade cutting edge 45. As the milling head is advanced along the tube, the bevel milling element 50 and inner tube milling element 30 contact the workpiece and mill a bevel into the tube or remove inner tube film, respectively. Depending on the configuration of milling elements 50 and 30, one operation may begin before another. For example, the inner surface of the workpiece may be milled by the inner milling element 30 before the bevel milling element 50 makes contact with the workpiece due to blade height, or vice versa.

After the desired milling operation has been performed, the rotary milling tool is disconnected from the workpiece leaving the workpiece having a beveled end section, a section where outer tube film has been removed, and a section where inner tube surface has been removed as illustrated in FIG. 1 with respect to workpiece 100.

In accordance with the patent statutes, the best mode and preferred embodiment have been set forth, the scope of the invention is not limited thereto, but rather by the scope of the attached claims.

What is claimed is:

1. A milling head for a rotary tool, comprising:
a substantially cylindrical body having a central axis and a bore adapted to receive an end portion of a tube, said body having a tool mounting connection adapted to be connected to the rotary tool, wherein the bore extends through axial ends of the body and is adapted to have an arbor of the rotary tool extend therethrough;
an inner tube milling element for milling an inner diameter surface of the tube to a depth below the end of the tube connected to the body and having a cutting surface located in the bore;
at least two outer tube milling elements for milling an outer diameter of the tube to a depth below the end of the tube connected to a milling element support of the body and each having a cutting surface located a greater radial distance from the central axis than the cutting surface of the inner tube milling element, wherein the cutting surface of at least one of the outer tube milling elements extends past one of the axial ends of the body; and
a bevel milling element for milling a bevel on the end of the tube connected to the body and having a cutting surface located in the bore with a portion of the cutting surface located at a greater radial distance from the central axis than the cutting surface of the inner tube milling element.

2. The milling head according to claim 1, wherein the inner tube milling element cutting surface has a longitudinal length which is disposed at an angle of 0° to about 60° measured with respect to an axis parallel to the central axis, wherein the cutting surface of at least one of the outer tube milling elements is located at a greater distance away from a bottom end of the milling head body when compared to the inner tube milling element cutting surface measured parallel to the central axis.

3. The milling head according to claim 2, wherein the inner tube milling element cutting surface longitudinal length is disposed at an angle of about 10° to about 37° measured with respect to an axis parallel to the central axis.

4. The milling head according to claim 2, wherein the inner tube milling element has a base portion which is adjustably connected to the body, and wherein the cutting surface substantially faces radially outward from the central axis.

5. The milling head according to claim 4, wherein the inner tube milling element base portion is connected in an element bed of the body and is fixable at a range of distances from the central axis.

6. The milling head according to claim 5, wherein the inner tube milling element cutting surface has a length from about 0.25 to about 2 inches, and wherein the outer tube milling element is connected to the body by a securing element having a head that either (a) extends a distance out from a face surface of the milling element which is less than or about equal to a second distance measured from an outer edge of the securing element to a nearest cutting surface, (b) is flush mounted, or (c) is recessed mounted in relation to the face surface.

7. The milling head according to claim 1, wherein the bevel milling element and the inner tube milling element cutting surface are each fixable at a range of radial distances from the central axis.

8. The milling head according to claim 7, wherein at least a portion of the bevel milling element cutting surface is located at a radial distance from the central axis which is less than the radial distance of the cutting surfaces of the at least two outer tube milling elements.

9. The milling head according to claim 8, wherein the cutting surface of at least one of the outer tube milling elements is a further distance away from a bottom end of the body when compared to the bevel milling element cutting surface.

10. The milling head according to claim 1, wherein the body comprises an upper section connected to a lower section, wherein the at least two outer tube milling elements are connected to the upper section and the bevel milling element and inner tube milling element are connected to the lower section.

11. The milling head according to claim 10, wherein the bevel milling element and the inner tube milling element are each connected to an element bed utilizing a fastener system.

12. The milling head according to claim 11, wherein at least one of the outer tube milling elements has a cutting edge affixed at an angle from 0° to about 85° with respect to an axis perpendicular to the central axis.

13. The milling head according to claim 12, wherein at least one of the outer tube milling elements has a cutting edge affixed at an angle from about 10° to about 45° with respect to an axis perpendicular to the central axis.

14. A milling head, comprising:
a) a body, the body having an upper section connected to a lower section through a fastener, wherein the lower section is adapted to be connected to a rotary milling tool, wherein the body has a bore, wherein the bore extends through the upper section and the lower section body and is adapted to have an arbor of a milling tool extend therethrough, wherein the bore in the upper section of the tool is adapted to receive an end portion of a tube;
b) an inner tube milling element for milling an inner surface of the tube to a death below the end of the tube adjustably connected to the lower section of the body; and
c) an outer tube milling element for milling an outer surface of the tube to a depth below the end of the tube connected to the upper section of the body and having a cutting surface located at a greater radial distance from a central axis than a cutting surface of the inner tube milling element; or
d) a bevel milling element for milling a bevel on an end portion of the tube adjustably connected to the lower section of the body wherein a portion of a cutting surface of the bevel milling element is located at a greater radial distance than the cutting surface of the inner tube milling element;
or a) and b) with both c) and d).

15. The milling head according to claim 14, wherein the inner tube milling element has a base portion which is adjustably connected to the body, and wherein the cutting surface substantially faces radially outward from the central axis.

16. The milling head according to claim 15, wherein the inner tube milling element base portion is connected to an element bed of the body and is fixable at a range of distances from the central axis, and wherein the outer tube milling element is connected to the upper section of the body by a securing element having a head that either (a) extends a distance out from a face surface of the milling element which is less than or about equal to a second distance measured from an outer edge of the securing element to a nearest cutting surface, (b) is flush mounted, or (c) is recessed mounted in relation to the face surface.

17. The milling head according to claim 15, wherein the inner tube milling element cutting surface has a longitudinal length which is disposed at an angle of 0° to about 60° measured with respect to an axis parallel to the central axis.

18. The milling head according to claim 17, wherein the inner tube milling element cutting surface has a longitudinal length which is disposed at an angle of about 10° to about 37° measured with respect to an axis parallel to the central axis.

19. The milling head according to claim 17, wherein the inner tube milling element cutting surface has a length of about 0.25 to about 2 inches.

20. The milling head according to claim 14, wherein the outer and bevel milling elements are both present, and wherein the cutting surface of the outer tube milling element extends past an end of the upper section of the body.

21. The milling head according to claim 20, wherein the bevel milling element and the inner tube milling element cutting surfaces are each independently fixable at a range of radial distances from the central axis.

22. The milling head according to claim 20, wherein at least a portion of the bevel milling element cutting surface is located at a radial distance from the central axis less than the radial distance of the cutting surface of the outer tube milling element.

23. The milling head according to claim 22, wherein the outer tube milling element is connected to the upper section and the bevel milling element and inner tube milling element are connected to the lower section.

24. The milling head according to claim 23, wherein the bevel milling element and the inner tube milling element are each connected to an element bed utilizing a fastener.

25. The milling head according to claim 20, wherein the outer tube milling element has a cutting edge affixed at an angle of 0° to about 85° with respect to an axis perpendicular to the central axis.

26. The milling head according to claim 25, wherein the outer tube milling element has a cutting edge affixed at an angle of about 10° to about 45° with respect to an axis perpendicular to the central axis.

27. The milling head according to claim 25, wherein the outer tube milling element cutting surface is a further distance away from a bottom end of the body when compared to the bevel milling element or inner tube milling element cutting surfaces or both.

28. A method for preparing a tube comprising the steps of:
providing a milling head to a rotary milling tool; the milling head comprising
a substantially cylindrical body having a central axis and a bore adapted to receive an end portion of the tube, said body having a tool mounting connection adapted to be connected to the rotary tool, wherein the bore extends through axial ends of the body and is adapted to have an arbor of the rotary tool extend therethrough;
an inner tube milling element for milling an inner diameter surface of the tube to a depth below the end of the tube connected to the body and having a cutting surface located in the bore;
at least two outer tube milling elements for milling an outer diameter of the tube to a depth below the end of the tube connected to a milling element support of the body and each having a cutting surface located a greater radial distance from the central axis than the cutting surface of the inner tube milling element, wherein the cutting surface of at least one of the outer tube milling elements extends past one of the axial ends of the body; and a bevel milling element for milling a bevel on the end of the tube connected to the body and having a cutting surface located in the bore with a portion of the cutting surface located at a greater radial distance from the central axis than the cutting surface of the inner tube milling element; and milling an end portion of the tube with the milling head thereby removing inner tube material to a depth below the tube end, removing outer tube material to a depth below the tube end, and milling a bevel on the tube end.

29. The method according to claim 28, including removing from about 2% to about 25% of a radial thickness of said tube during the outer tube material removal step.

30. The method according to claim 28, wherein the inner tube material removal step imparts to an inner section of the tube an angled section having an angle from 0° to about 60° measured with respect to the longitudinal axis of the tube.

31. The method according to claim 30, wherein the outer tube material removal step is performed to a depth from about 0.25 to about 1.5 inches when measured from the tube end, and wherein the inner tube material removal step is performed to a depth from about 0.25 to about 2 inches.

32. The method according to claim 31, wherein the bevel milling step imparts a bevel having an angle from about 30° to about 60° to the tube with respect to the longitudinal axis of the tube.

33. The method according to claim 28, further including the steps of connecting an arbor having a collet to the milling tool and securing the collet in the tube prior to milling the end portion of the tube.

* * * * *

UNITED STATES PATENT AND TRADEMARK OFFICE
CERTIFICATE OF CORRECTION

PATENT NO. : 7,140,816 B2 Page 1 of 1
APPLICATION NO. : 10/894831
DATED : November 28, 2006
INVENTOR(S) : J. Randall Hall It is certified that error appears in the above-identified patent and that said Letters Patent is hereby corrected as shown below:

Col. 11

In Claim 14, line 39, please replace "death" with --depth--.

Signed and Sealed this

Eighth Day of July, 2008

JON W. DUDAS
*Director of the United States Patent and Trademark Office*